(12) United States Patent
Almahmoud et al.

(10) Patent No.: US 11,364,857 B2
(45) Date of Patent: Jun. 21, 2022

(54) MODULAR INTERIOR VEHICLE ELECTRONICS SYSTEM

(71) Applicant: Toyota Motor Engineering & Manufacturing North America, Inc., Plano, TX (US)

(72) Inventors: Faleh Almahmoud, Belleville, MI (US); Ryan C Harris, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 110 days.

(21) Appl. No.: 16/264,274

(22) Filed: Jan. 31, 2019

(65) Prior Publication Data

US 2020/0247328 A1 Aug. 6, 2020

(51) Int. Cl.
*B60R 11/02* (2006.01)
*G06F 3/0488* (2022.01)
*G06F 3/04817* (2022.01)
*B60R 16/023* (2006.01)
*G06F 3/04847* (2022.01)
*B60R 11/00* (2006.01)

(52) U.S. Cl.
CPC ...... *B60R 11/0264* (2013.01); *B60R 11/0235* (2013.01); *B60R 16/0231* (2013.01); *G06F 3/0488* (2013.01); *G06F 3/04817* (2013.01); *G06F 3/04847* (2013.01); *B60R 2011/001* (2013.01)

(58) Field of Classification Search
CPC ............ B60R 11/0264; B60R 11/0235; B60R 16/0231; B60R 16/027; B60R 2011/0007; B60R 2011/001; G06F 3/04817; G06F 3/0482; G06F 3/0484; G06F 3/04847; G06F 3/0488
See application file for complete search history.

(56) References Cited

U.S. PATENT DOCUMENTS

| 4,792,783 | A | 12/1988 | Burgess et al. |
| 8,406,961 | B2 | 3/2013 | Pathak et al. |
| 8,918,252 | B2* | 12/2014 | Frojdh ............... H04M 1/72469 701/41 |
| 9,321,349 | B2 | 4/2016 | Graumann et al. |
| 9,440,536 | B2 | 9/2016 | Toggweiler et al. |
| 2006/0050018 | A1* | 3/2006 | Hutzel .................... B60K 37/06 345/60 |
| 2012/0283894 | A1* | 11/2012 | Naboulsi ................. A61B 5/18 701/1 |
| 2013/0134730 | A1* | 5/2013 | Ricci ....................... G06Q 40/08 296/24.34 |
| 2013/0145279 | A1* | 6/2013 | Ricci ..................... B60W 40/09 715/746 |

\* cited by examiner

*Primary Examiner* — Ig T An
(74) *Attorney, Agent, or Firm* — Oblon, McClelland, Maier & Neustadt, L.L.P.

(57) ABSTRACT

The present disclosure relates to a vehicle user interface system allowing for plug and play customizations of vehicle electronics. These customizations are permitted by the use of vehicle electronics modules that can be moved as desired without requiring additional programming from the user to map a desired function to a specific switch of the vehicle electronics system.

16 Claims, 14 Drawing Sheets

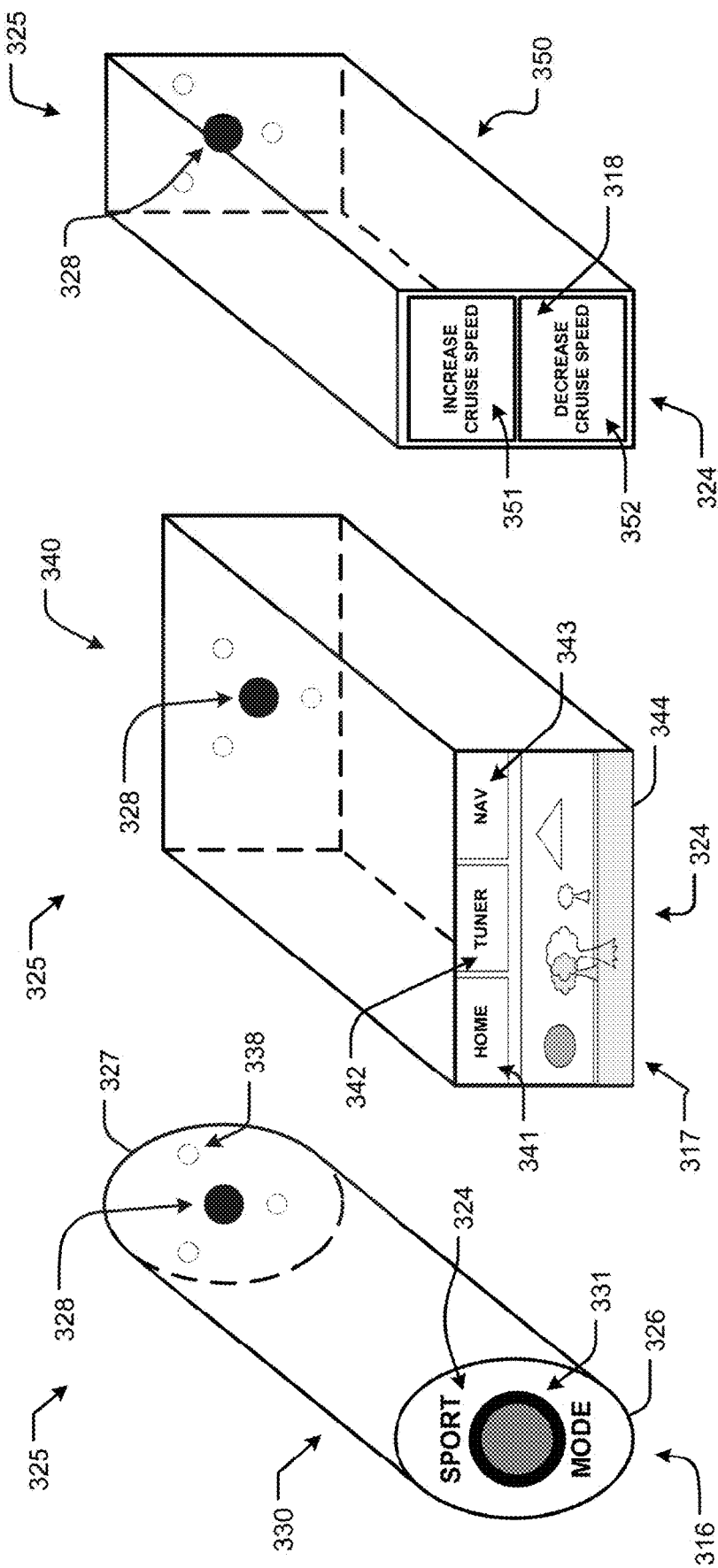

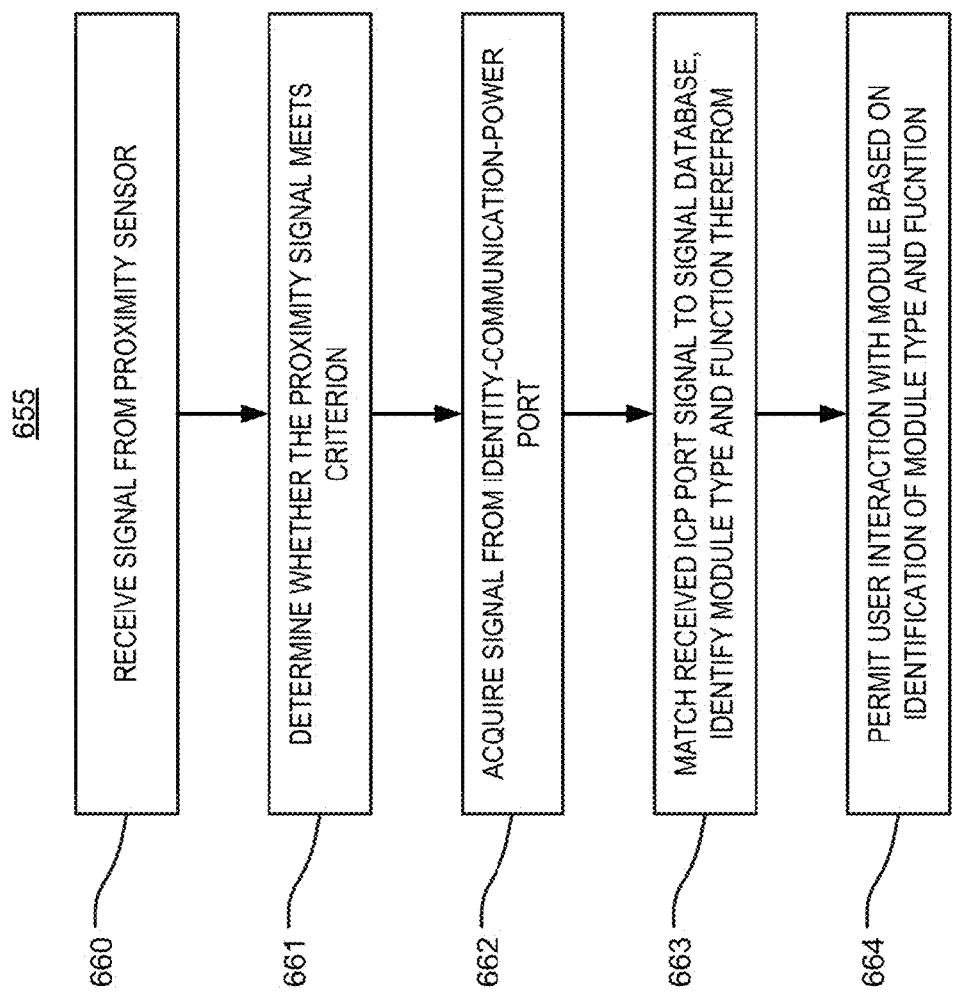

MODULAR INTERIOR VEHICLE ELECTRONICS SYSTEM

BACKGROUND

As vehicle users become savvier, the attendant interest in vehicle customizations is increased. This is especially true of vehicle electronics, where the type, function, and position of vehicle electronics can be a primary driver of interest in a particular model of vehicle. Manufacturers have, therefore, been motivated to develop customizable systems, accordingly. For instance, U.S. Pat. No. 8,406,961 entitled "Reconfigurable vehicle user interface system" by Pathak, et al, is directed to a vehicle user interface that can be customized according to a user's mapping of function commands to specific portions of the vehicle user interface. While it may be possible to map a specific function to, for instance, a switch, a plug and play system for customization of a vehicle user interface system is yet to be described.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a modular vehicle electronics system that is customizable to the needs of a user.

According to an embodiment, the present disclosure is further related to a modular vehicle electronics system, comprising a vehicle electronics module receptacle, the vehicle electronics module receptacle being a structure having a proximity sensor at a basal end, a vehicle electronics module being insertable into the vehicle electronics module receptacle, the vehicle electronics module being a structure corresponding to the structure of the vehicle electronics module receptacle and having, at an apical end, a user interface, and processing circuitry configured to receive, from the proximity sensor, a proximity signal, determine whether the received proximity signal achieves a pre-determined proximity threshold, acquire, based upon the determination, an identity signal from an identity sensor, the identity signal corresponding to an identity of the vehicle electronics module, match the acquired identity signal with a reference identity signal stored within a reference identity signal database, the reference identity signal being associated with an at least one characteristic of a reference vehicle electronics module, and assign, based upon the match, the at least one characteristic of the reference vehicle electronics module to the vehicle electronics module, one of the at least one characteristic of the reference electronics module being an intended function.

According to an embodiment, the present disclosure is further related to a method of a modular vehicle electronics system, comprising receiving, by a processing circuitry, a proximity signal from a proximity sensor, the proximity sensor being disposed at a basal end of a vehicle electronics module receptacle having a structure, determining, by the processing circuitry, whether the received proximity signal achieves a pre-determined proximity threshold, acquiring, by the processing circuitry, an identity signal from an identity sensor based upon the determination, the identity signal corresponding to an identity of a vehicle electronics module, matching, by the processing circuitry, the acquired identity signal with a reference identity signal stored within a reference identity signal database, the reference identity signal being associated with an at least one characteristic of a reference vehicle electronics module, and assigning, by the processing circuitry and based upon the match, the at least one characteristic of the reference vehicle electronics module to the vehicle electronics module, one of the at least one characteristic of the reference electronics module being an intended function, wherein the vehicle electronics module is insertable into the vehicle electronics module receptacle, the vehicle electronics module being a structure corresponding to the structure of the vehicle electronics module receptacle and having, at an apical end, a user interface.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A is an illustration of a vehicle electronics module, according to an exemplary embodiment of the present disclosure;

FIG. 3B is an illustration of a vehicle electronics module, according to an exemplary embodiment of the present disclosure;

FIG. 3C is an illustration of a vehicle electronics module, according to an exemplary embodiment of the present disclosure;

FIG. 6 is a flow diagram of a method of a vehicle electronics control device and a vehicle electronics module, according to an exemplary embodiment of the present disclosure;

DETAILED DESCRIPTION

Figure 1:
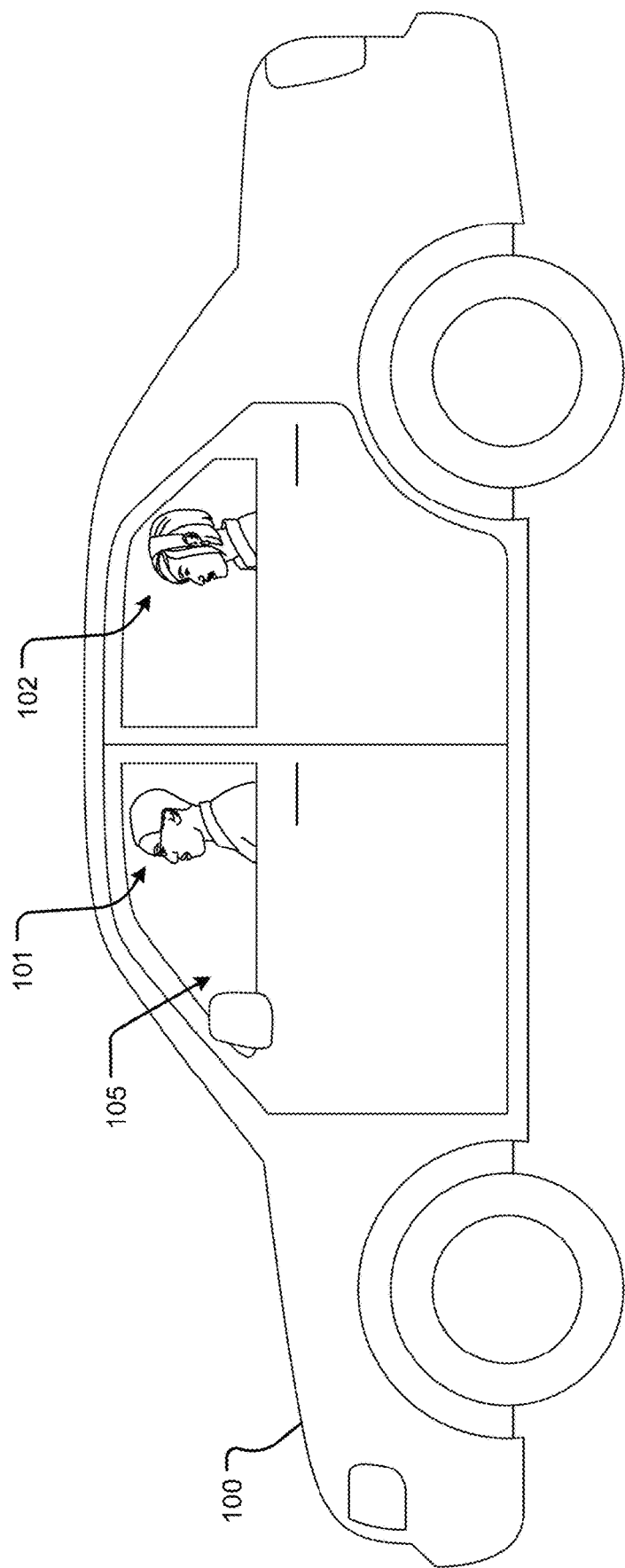
FIG. 1 is an illustration of an automotive vehicle, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Modern automotive vehicles provide users with several options with regard to costs and features. Currently available automotive vehicles, however, fail to allow for economical customization of an automotive vehicle at the level of the individual user. Moreover, the ability to adjust the ergonomics and aesthetics of, for example, vehicle interior electronics systems (i.e., knobs, switches, displays, etc.), is lacking and limits the user's freedom in modifying their surroundings to maximize their enjoyment of the automotive experience.

For instance, automotive vehicle interiors available today have prepositioned controls that cannot be relocated or changed to accommodate to the requirements of a user. As such, the user may be inconvenienced or distracted by, for example, controls that are difficult to reach. In addition, current positioning of controls cannot effectively account for the widely varying sizes and shapes of user's hands, thereby inflicting strain injury on a segment of the population.

Recent efforts directed to the customization of a vehicle's interior have relied heavily on the reassignment of functions of existing components of a user interface. This can include reprogramming a microprocessor to understand that a signal transmitted from a particular switch of the vehicle is indicative of a desired function of the user, the desired function being different from a previous desire of the user. The same approach has been applied to devices featuring touch screens, wherein a specific area of a touch screen display can be reprogrammed to be mapped to a different function.

It can be appreciated that the above-described efforts fail to provide a robust and convenient system for customization, limiting the user to reassignment of simple tasks and requiring a working knowledge of programming. For instance, according to previous strategies, a switch controlling cruise control that is positioned adjacent the right hand of the steering wheel could not be reassigned to be a touch screen display, as the 'switch' type has changed. This lack of flexibility and customization is the focus of the present disclosure.

According to an embodiment, the present disclosure describes a system enabling a user to have configurable layouts of vehicle electronics, including the positioning of knobs, buttons, and other electronics in a vehicle's interior. Importantly, the system of the present disclosure allows for repositioning of vehicle electronics by merely removing a vehicle electronic module from a first position and transferring it to a second position. In this way, the present disclosure describes a system allowing for personalized ergonomics and vehicle interior customizations that maximizes enjoyment of the individual.

Generally, a modular vehicle electronics system allows the user to position buttons, knobs, displays, interactive displays, and other controls wherever desired. Frequently used dashboard buttons can be moved closer to the driver to improve overall ergonomics, comfort, and focus. A modular interior allows for different configurations of electronics that are adapted to suit different applications. For instance, a racing enthusiast may elect to have suspension and power settings on the steering wheel while racing but may desire to have a more traditional layout during a regular commute. It can be appreciated that such adaptability and comfort optimization is not possible with current technology, wherein current interior designs allow for only a minimal degree of personalization that is often limited to seat and steering wheel location.

Briefly introduced above, the modular vehicle electronics system of the present disclosure will be better understood with reference to the Figures.

Referring now to FIG. 1, the present disclosure describes a modular vehicle electronics system (MVES) of an automotive vehicle 100. The automotive vehicle 100 may have a vehicle interior 105. The vehicle interior 105 may include, in an example, a driver 101 and at least one passenger 102. In another example, the automotive vehicle 100 can be an autonomous vehicle and a corresponding vehicle interior 105 can have one or more passengers 102.

According to an embodiment, the vehicle interior 105 can include a plurality of vehicle electronics modules (VEM) that can be arranged according to the liking of the user. The automotive vehicle 100 can be designed so that the plurality of VEMs can be interchangeable throughout the vehicle interior 105 according to a location of a vehicle electronics module receptacle (VEM-R). For instance, there may be one or more VEM-Rs located within the rear center console of the vehicle interior 105 so that at least one passenger 102 in the rear end of the automotive vehicle 100 can customize a corresponding user interface and control settings relevant thereto. In addition to the rear center console of the vehicle interior 105, VEM-Rs can be located in the forward end of the vehicle interior 105 and can be located in areas including, among others, the steering wheel, the center console, the electronic instrument cluster, and the armrests of the doors. VEM-Rs can be defined structures within the vehicle interior 105 or can be defined only by a surface of the vehicle interior 105 having an identity-communication-power port (to be described later).

According to an embodiment, each VEM can be one of a plurality of VEMs comprising a module motif, each module motif comprising a plurality of VEMs with a central focus. One module motif may be directed to track days, as suggested above, wherein a plurality of VEMs sensitive to driver hand accessibility is included. A second module motif may be directed to road trips, wherein the VEMs reflect the need to provide entertainment while on the road. Regardless of the module motif, the position of each of the VEMs of each module motif can be arranged as the user sees fit. In an embodiment, each of the VEMs of multiple module motifs can be combined according to the desires of the user. Moreover, as mentioned above, each VEM of the module motifs can be arranged such that, in an example, the result is a combination of a VEM from a track day module motif with a VEM from a day care module motif.

A more thorough description of a VEM and a VEM-R will be described in greater detail in the coming Figures.

Figure 2:
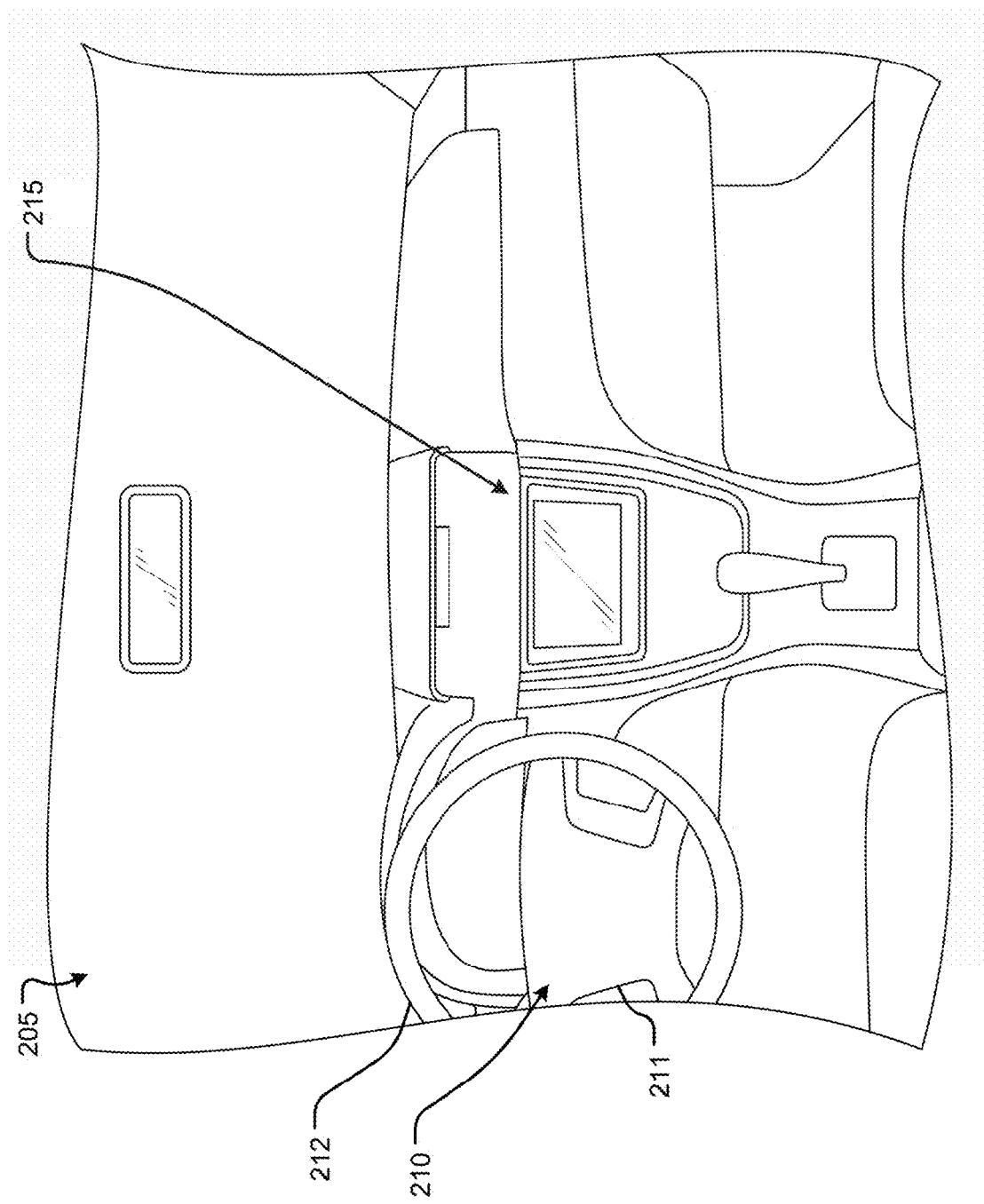
FIG. 2 is an illustration of a vehicle interior of an automotive vehicle, according to an exemplary embodiment of the present disclosure.

Referring now to FIG. 2, the VEMs and VEM-Rs of the present disclosure can define customization of a vehicle interior 205 of an automotive vehicle and, in particular, the forward area of the vehicle interior 205. To this end, FIG. 2 illustrates regions of the forward end of the vehicle interior 205 that can be customized, in an example. Presented as a single user interface in FIG. 2, a center console 215 can be customized according to a user's needs and may comprise a plurality of VEMs having varied functionality. In addition, a steering wheel 210 can be modified in order to locate VEMs of interest within convenient reach of the hands of the driver. For instance, one or more VEMs can be disposed within a handle 212 of the steering wheel 210 and/or one or more VEMs can be disposed within a body 211 of the steering wheel 210.

As introduced above, and with respect now to FIGS. 3A through 3C, the present disclosure describes a plurality of VEMs with characteristics unique thereto.

Generally, each VEM 325 illustrated in FIG. 3A through FIG. 3C comprises a structure having an apical end 326, or apex, and a basal end 327, or base. The length of the structure of each VEM 325, therebetween, can be dependent upon the specific dimensions of a corresponding VEM-R and/or according to the specifications of the VEM 325. At the basal end 327 of each VEM 325 is located an identity-communication-power (ICP) port 328. The ICP port 328 can comprise electrically-wired and/or wireless connections to provide for transmission of power, control signals, and data signals, between the VEM 325 and processing circuitry of a vehicle electronics control device (VECD) of the automotive vehicle. In addition, a coupling mechanism can be located at the basal end of the VEM 325 to secure the VEM 325 within a VEM-R.

As shown, the shape of the structure of each VEM 325 can be unique to a specific area of an automotive vehicle. In an example, a handle of a steering wheel may require that a VEM 325 having an elliptical cross-section be used. The cross-sectional shape of the VEM 325 can also be dependent directly on the shape of a user interface 324 disposed at the apical end 326 of the VEM 325. In one instance, a display may dictate that the cross-sectional shape of the VEM 325 be rectangular. In another instance, a joystick may dictate that the cross-sectional shape of the VEM 325 be circular. According to an embodiment, the shape of the structure of each VEM 325 can also be independent of a specific area of an automobile or of the user interface 324 thereon. The cross-sectional shape may instead by defined by an intended modularity of each VEM 325, wherein each VEM 325, regardless of user interface 324, can be insertable into any available VEM-R throughout a vehicle interior of an automotive vehicle. This idea will be explored in more detail with reference to subsequent Figures.

According to an embodiment, and as introduced, the ICP port 328 of each VEM 325 can comprise wired and/or wireless connections. In an embodiment, the ICP port 328 can include a wireless energy transfer mechanism, a wireless communication hub for transferring dynamic information in real-time, and a short-range wireless communication mechanism for transferring static information relating to the VEM 325 (e.g. the identity). In an embodiment, the wireless energy transfer mechanism can be, among others, inductive coupling, resonant inductive coupling, capacitive coupling, magnetodynamic coupling, microwaves, and light waves. In an embodiment, the wireless communication hub can employ, among others, Bluetooth, Zigbee, Z-wave, and Wi-Fi for transmitting dynamic information relating to the current status of features of the user interface and for controlling said features thereof. In an embodiment, the short-range wireless communication mechanism for transferring static information relating to the identity of the VEM 325 can employ, among others, near-field communications, radio-frequency identification, hearing-aid wireless, and infrared wireless. The short-range wireless communication mechanism may comprise a wireless tag on the basal end of the VEM 325 and a corresponding wireless reader on a basal end of a VEM-R. For instance, this can be a radio-frequency identification tag and a radio-frequency identification reader. In an embodiment, the short-range wireless communication mechanism can be combined with the wireless communication hub. It can be appreciated that the above described wireless energy transfer mechanism, wireless communication hub, and short-range wireless communication mechanism are representative of a variety of mechanisms for accomplishing the same there, therefore, should be considered non-limiting.

According to an embodiment, the coupling mechanism located at the basal end of the VEM 325 can be a magnetic coupling mechanism 338. The magnetic coupling mechanism 338 may comprise, for example, a plurality of magnetic elements arranged concentrically around the ICP port 328. In another example, the plurality of magnetic elements can be arranged askew such that alignment of the VEM 325 can be ensured. Though described as a magnetic element herein, it can be appreciated that the coupling mechanism may be any mechanism for securing the VEM 325 within a VEM-R, including, among others, a clasping mechanism.

Further, and as introduced above, each VEM 325 of FIGS. 3A through 3C can have a user interface 324 located at the apical end 326 of the structure of the VEM 325. Each user interface 324 can be specific to an intended type of interface and/or an intended function.

According to an embodiment, FIG. 3A illustrates a VEM 325 having a user interface 324 at an apical end 326 of the VEM 325, the VEM 325 being a sport mode module 330 and having a user interface 324 that is a button-type interface 316. In an embodiment, the button-type interface 316 has a button switch 331, wherein the automotive vehicle, via the sport mode module 330, can be placed into sport mode and removed from sport mode by pressing the button switch 331. Moreover, it can be appreciated that, though the VEM 325 of FIG. 3A has a structure having an elliptical cross-section, which may be suited to a handle of a steering wheel, the structure may have any cross-sectional shape suited to a corresponding VEM-R.

According to an embodiment, FIG. 3B illustrates a VEM 325 having a user interface 324 at an apical end of the VEM 325, the VEM 325 being an interactive display module 340 and having a display-type interface 317 with a display 344. The interactive display module 340 can include a touch screen feature adjacent the display 344 or encompassed together therewith. In an example, as illustrated in FIG. 3B, the display-type interface 317 can include a navigational camera as the display 344 and can include one or more interactive features as a part of the touch screen feature of the interactive display module 340. The touch screen feature can provide controls by which the user can modify the automotive vehicle and/or modify the display 344 of the interactive display module 340. For instance, the touch screen feature can include HOME 341, TUNER 342, and NAV (i.e., navigation) 343, allowing the user to have control therethrough. It can be appreciated that, though the VEM 325 of FIG. 3B has a structure having a rectangular cross-section, which may suited to a center console or a body of a steering wheel of a vehicle interior, the structure may have any cross-sectional shape suited to a corresponding VEM-R.

According to an embodiment, FIG. 3C illustrates a VEM 325 having a user interface 324 at an apical end of the VEM 325, the VEM 325 being a cruise control module 350. The cruise control module 350 can include a rocker-type interface 318 that allows for a toggle between 'increase cruise speed' 351 and 'decrease cruise speed' 352 or a non-locking interface that allows transient depression of buttons corresponding to incremental increases or decreases in cruise control speed. As indicated, the cruise control module 350 may be positioned within a VEM-R of a body of a steering wheel for convenient manipulation by the hands of a driver in order to increase or decrease the speed of the vehicle. It can be appreciated that, though the VEM 325 of FIG. 3C has a structure having a rectangular cross-section, which may be suited to the body of the steering wheel of the vehicle interior, the structure may have any cross-sectional shape suited to a corresponding VEM-R.

The embodiments of FIGS. 3A through 3C are merely exemplary of a variety of user interfaces and VEM structures that can be used and/or combined in order to achieve a desired arrangement. In order to achieve such customization, an automotive vehicle may be manufactured to have a variety of VEM-Rs disposed at positions throughout the vehicle. For instance, an automotive vehicle may be manufactured having eight square VEM-Rs, eight rectangular VEM-Rs, and eight elliptical VEM-Rs, each of the VEM-Rs being disposed within different components of the vehicle including the center console and the steering wheel, as appropriate.

In an embodiment, when not in use, vacant VEM-Rs can be filled with 'blank' VEMs.

Figure 4A:
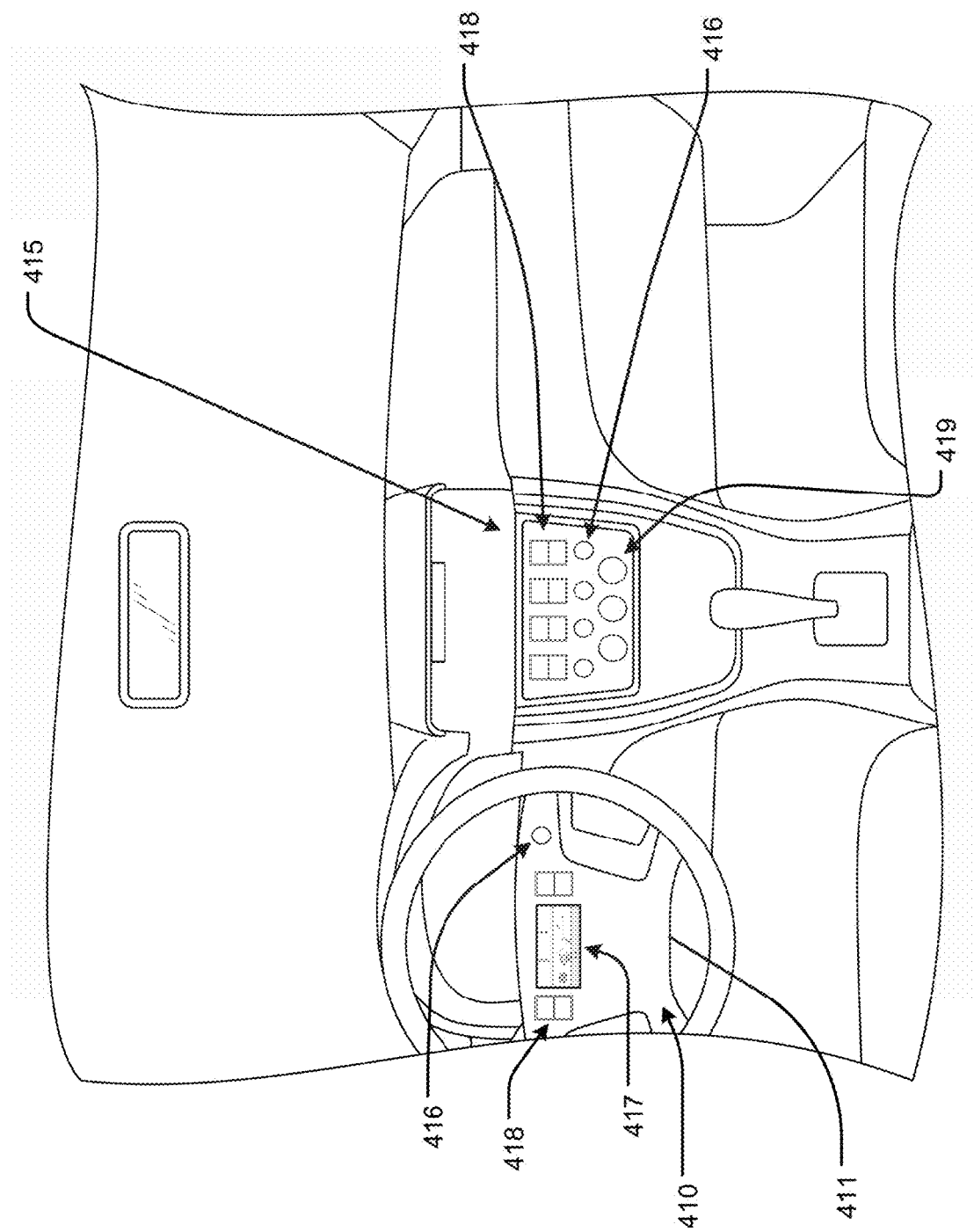
FIG. 4A is an illustration of a vehicle interior of an automotive vehicle having an arrangement of vehicle electronics modules, according to an exemplary embodiment of the present disclosure.
Figure 4B:
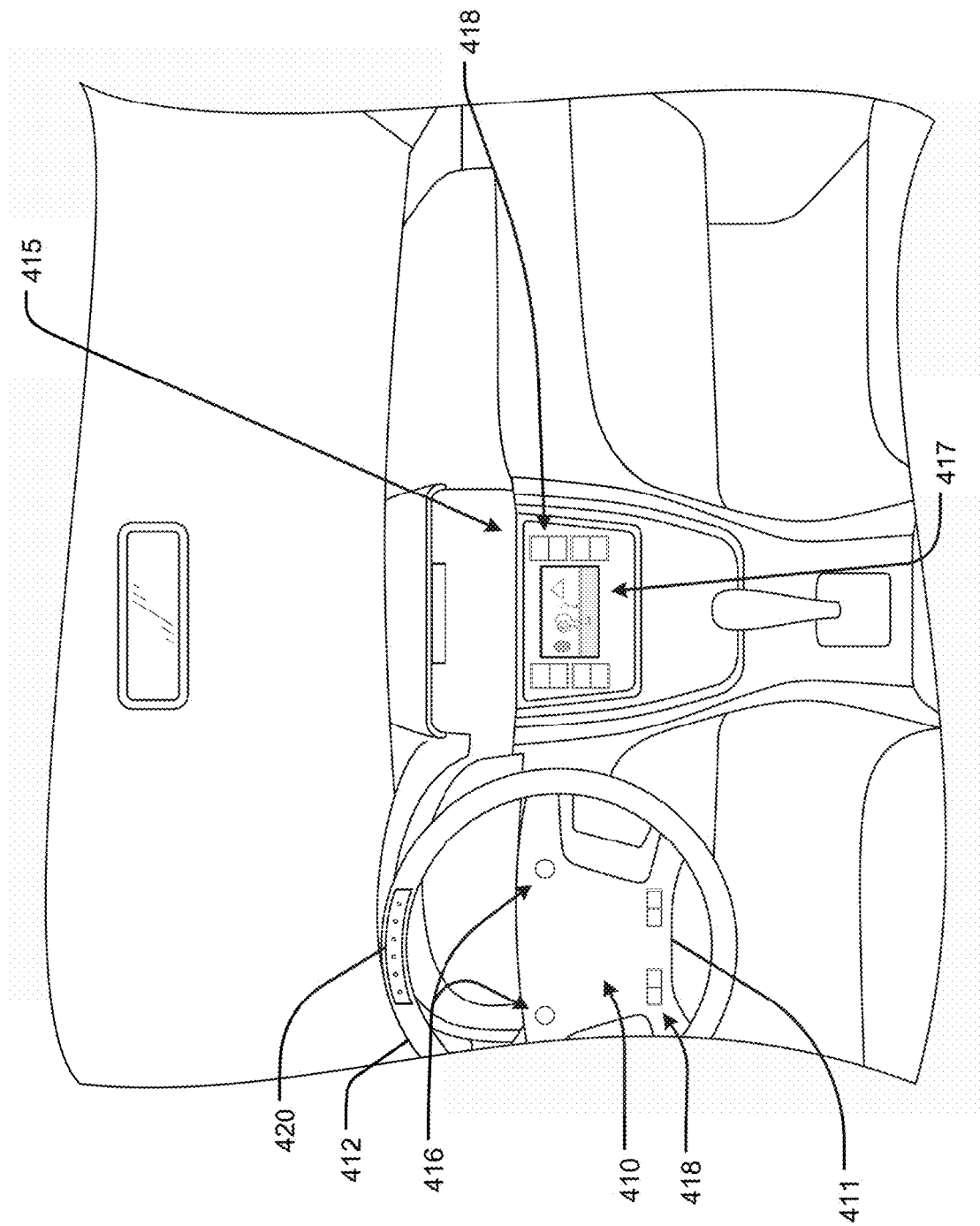
FIG. 4B is an illustration of a vehicle interior of an automotive vehicle having an arrangement of vehicle electronics modules, according to an exemplary embodiment of the present disclosure.

As discussed, the above-described VEMs of FIGS. 3A through 3C can be positioned at the desire of the user in VEM-Rs located within the vehicle interior. FIG. 4A and FIG. 4B provide illustrations of two configurations of a vehicle interior of an automotive vehicle, each configuration illustrating the types of interfaces that can be included.

FIG. 4A provides a vehicle interior having a center console 415 and a steering wheel 410. In an embodiment, a plurality of VEMs having rocker-type interfaces 418 can be disposed within a body 411 of the steering wheel 410 and can flank a VEM having a display-type interface 417, the display-type interface 417 featuring a navigational camera of the surrounding environment. A VEM having a button-type interface 416 can be located adjacent a handle of the steering wheel 410 and can be within reach of a hand of a driver. The center console 415 can have an array of VEMs of a variety of types of interfaces. The center console 415 can include a plurality of VEMs having rocker-type interfaces 418, a plurality of VEMs having button-type interfaces 416, and a plurality of VEMs having rotary-type interfaces 419.

FIG. 4B provides a vehicle interior having a center console 415 and a steering wheel 410. The configuration of FIG. 4B may include VEMs of a track day module motif. In an embodiment, a plurality of VEMs having rocker-type interfaces 418 can be disposed within a body 411 of the steering wheel 410. A plurality of VEMs having button-type interfaces 416 can be disposed adjacent to a handle 412 of the steering wheel 410 and within reach of a hand of a driver. Additionally, a VEM having an optics-type interface 420 can be disposed within the handle 412 of the steering wheel, the optics-type interface 420 having one or more light-emitting diodes. The center console 415 can have an array of VEMs of a variety of types of interfaces. The center console 415 can include a plurality of VEMs having rocker-type interfaces 418 and a display-type interface 417, the display-type interface 417 displaying a navigational scene.

As can be appreciated, while the VEMs discussed above with reference to FIG. 4A and FIG. 4B are generally described in the context of interface types, each VEM of the plurality of VEMs can have a unique function that is controlled by the interface. Moreover, as will be described later, the unique function of each VEM can be realized, in an example, by a variety of interface types.

Figure 5A:
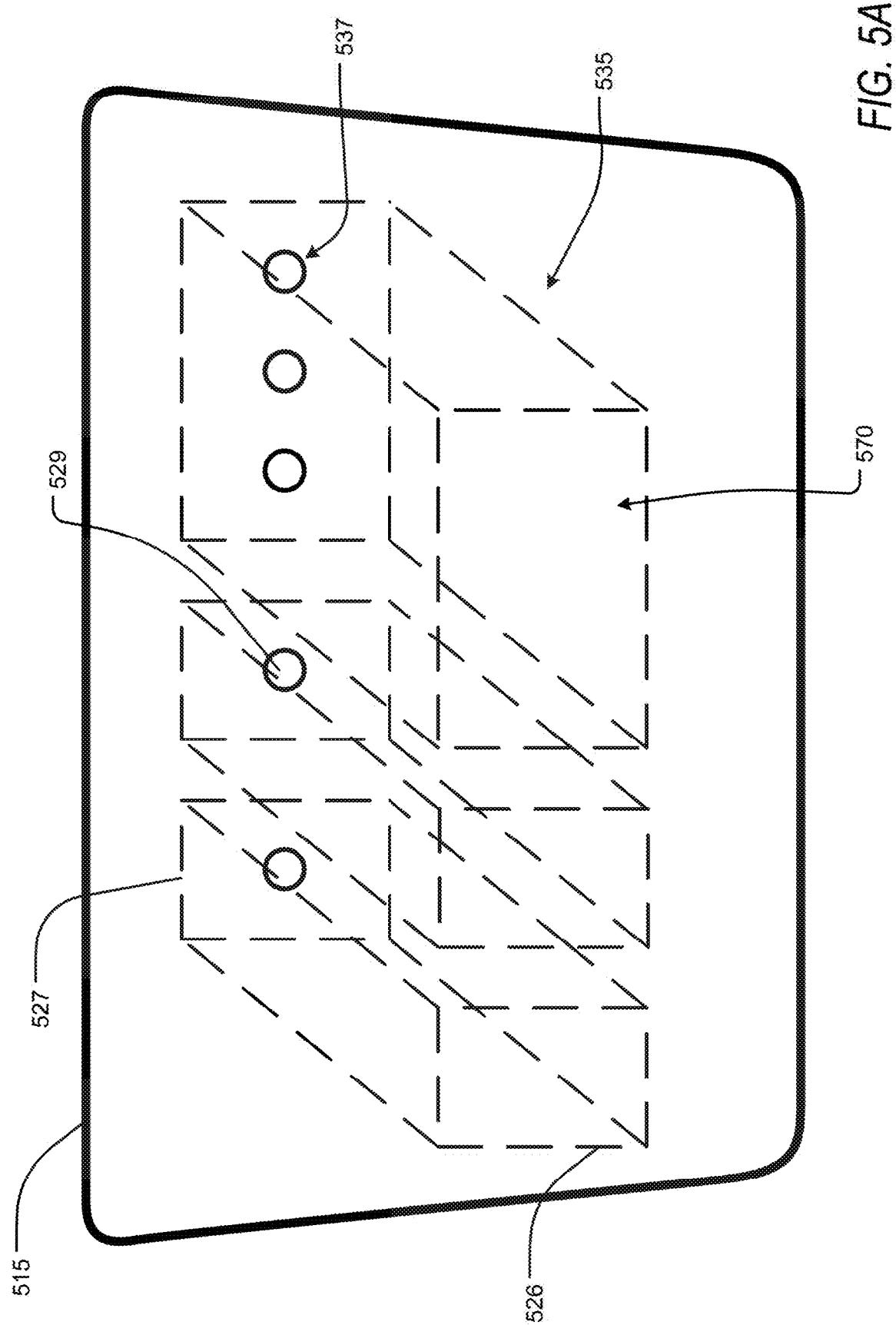
FIG. 5A is an illustration of a center console of an automotive vehicle having a plurality of vehicle electronics module receptacles, according to an exemplary embodiment of the present disclosure.
Figure 5B:
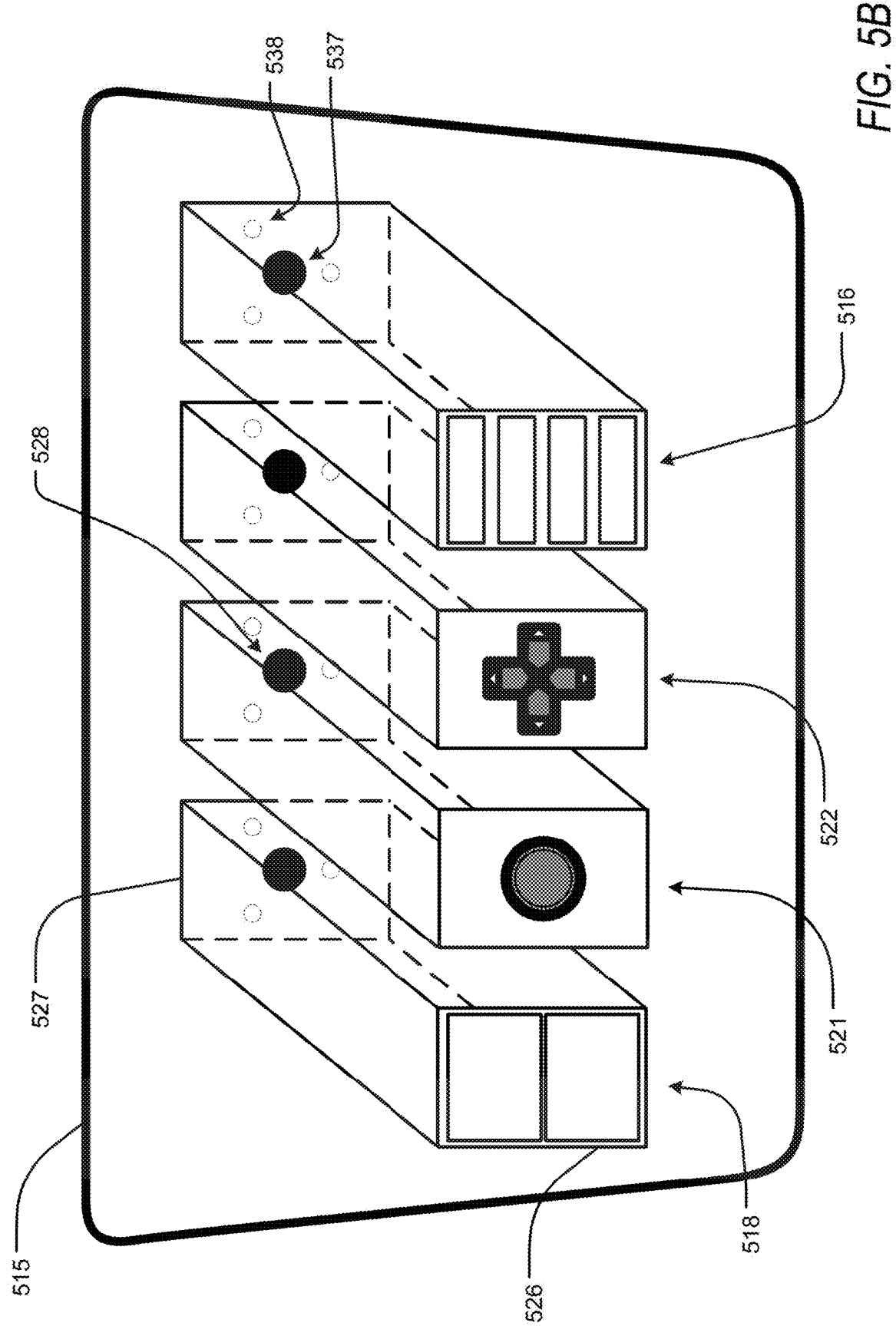
FIG. 5B is an illustration of a center console of an automotive vehicle having a plurality of vehicle electronics module receptacles, according to an exemplary embodiment of the present disclosure.
Figure 5C:
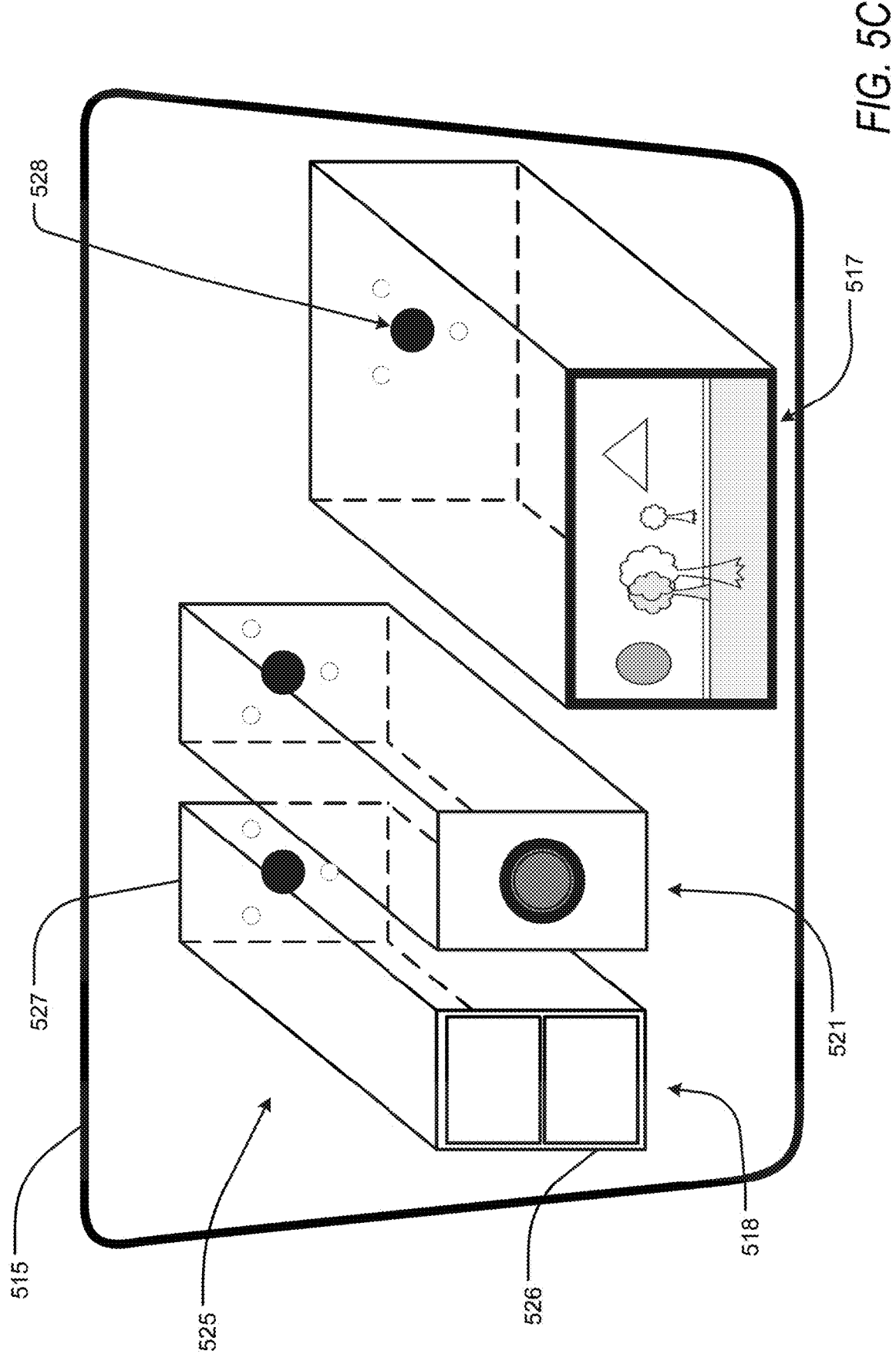
FIG. 5C is an illustration of a center console of an automotive vehicle having a plurality of vehicle electronics module receptacles, according to an exemplary embodiment of the present disclosure.

With reference now to FIGS. 5A through 5C, the modularity of the VEMs of the present disclosure can be dependent upon the structure of associated VEM-Rs of the MVES. To this end, FIG. 5A illustrates, in an example, a plurality of VEM-Rs 535 of a center console 515 of an automotive vehicle. It should be appreciated that the arrangement of the plurality of VEM-Rs 535 of FIG. 5A is merely exemplary of a variety of arrangements of VEM-Rs 535 within an automotive vehicle and within a center console 515, in particular.

Each VEM-R 535 of the above-described arrangement includes a structure. For descriptive purposes, the structure can have a basal end 527, or base, and an apical end 526, or apex, though the general structure is non-limiting. In order to allow for transferring of power, communication, and control between the VEM-R 535 and a VEM, each VEM-R 535 including an ICP port 529 at the basal end 527 of the structure. The ICP port 529 of each VEM-R 535 shown in FIG. 5A can be positioned at the basal end 527 of the structure such that it is concentric with an ICP port of a corresponding VEM. Moreover, the ICP port 529 of each VEM-R 535 can be comprised of components that are substantially similar to that described with respect to the VEMs 525 of FIG. 3A to FIG. 3C.

According to an embodiment, the ICP port 529 further includes an identity sensor. The identity sensor can be a sensor having the capacity for short-range wireless communication of static information, as introduced above with respect to FIG. 3A to FIG. 3C, relating to the identity of a VEM. Such information can be transferred to processing circuitry of a VECD via the VEM-R535. In an example, short-range wireless communication system can be a near-field communication (NFC) system. Accordingly, an NFC tag can be disposed within the ICP port of the VEM and an NFC reader can be disposed within the ICP port 529 of the VEM-R 535. The incorporation of such a static, or passive, sensor allows for matching of the identity of the VEM by processing circuitry of the VECD in order to determine the function and interface type of the VEM.

In an embodiment, each VEM-R 535 further includes a proximity sensor 537 disposed at the basal end 527 of the structure of the VEM-R 535. During operation, the proximity sensor 537 can provide a proximity signal that allows processing circuitry of the vehicle electronics control device to determine if a VEM is resident within the VEM-R 535. The proximity sensor 537 can be one of a variety of proximity sensors capable of detecting the proximity of a target and can be selected from the group including, among others, inductive sensors and optical sensors. In an embodiment, the proximity sensor 537 can be an optical sensor, the optical sensor using infrared light to determine a distance between the basal end of the VEM-R 535 and a basal end of a VEM.

As shown in the center console 515 of FIG. 5A, VEM-Rs 535 can be located at intervals along a length of the center console 515, as depicted with dashed lines indicating a generally rectangular cross-section of the structure of the VEM-R 535. The VEM-Rs 535 can be placed at regular or intermittent intervals, as desired. Moreover, the cross-sectional shape of the structure of the VEM-R 535 is not limiting, the dashed lines of FIG. 5A merely providing a visualization of a potential boundary of a VEM when secured.

Moreover, it can be appreciated that the VEM-Rs 535 described above are fundamentally comprised of an ICP port 529 and related proximity sensor 537 that are a component of an array of ICP ports 529 and proximity sensors 537, each ICP port 529 and related proximity sensor 537 being positioned as desired. To this end, and defining the modularity of the MVES, each ICP port 529 and related proximity sensor 537 can be defined within a slot 570 having a flat top surface and a flat bottom surface, for example, with a removable guide rail forming divisions between adjacent ICP ports 529 and related proximity sensors 537. It can be appreciated that any arrangement, ordered or not, of the above-defined VEM-Rs 535, can be created in order to adapt to the needs of the user without deviating from the spirit of the invention of the present disclosure.

With reference now to FIG. 5B, a plurality of VEMs 525 may be secured within corresponding VEM-Rs of a center console 515, such as those described with reference to FIG. 5A. As shown in FIG. 5B, the function and interface type of a VEM 525 can be independent of the cross-sectional shape of the structure. In fact, the cross-sectional shape of the structure of each VEM 525 may be the same, as in FIG. 5B, or may be different, as shown in FIGS. 3A to 3C. Moreover, the cross-sectional shape of the structure of each VEM 525 may be the same or different within a given class of interface types.

In an embodiment, each VEM 525 of the plurality of VEMs 525 can have a user interface at an apical end 526 of the structure of the VEM 525. Additionally, each VEM 525 of the plurality of VEMs 525 can have an ICP port 528 at a basal end 527 of the structure of the VEM 525, the position of the ICP port 528 of the VEM 525 corresponding to an ICP port of a VEM-R. In this way, the ICP port 528 of the VEM 525 is functionally positioned relative to the ICP port of the VEM-R and a proximity sensor 537 thereof.

According to an embodiment, the ICP port 528 further includes an identity sensor. For the sake of brevity, the identity sensor can be substantially similar to that described with respect to the ICP port of the VEM-R, mutatis mutandis.

In an embodiment, a coupling mechanism (described previously) can also be included at the basal end 527 of the structure of the VEM 525. The coupling mechanism can be, as shown in FIG. 5B, a series of magnets 538 positioned concentrically around the ICP port 528 of the VEM 525.

In an embodiment, each VEM 525 of the plurality of VEMs 525 can have a user interface selected from the group including, among others, a rocker-type interface 526, a joystick-type interface 521, a directional pad-type interface 522, and a button-type interface 516.

A continuation of the above, FIG. 5C illustrates a configuration of VEMs wherein alternate positions of ICP ports can be employed. For instance, a center console 515 of an automotive vehicle can have a plurality of VEMs 525 having an apical end 526 and a basal end 527. An ICP port 528 can be disposed at the basal end 527 of each VEM 525. A user interface can be disposed at the apical end 526 of each VEM 525. The user interface can be selected from a group including, among others, a rocker-type interface 518, a joystick-type interface 521, a display-type interface 517, rotary-type interface, or a camera-type interface. As shown in FIG. 5C, and in view of FIGS. 3A, 3B, 3C and 5B, a variety of arrangements of VEM-Rs can be exploited to allow for implementation of VEMs 525 having structures with a variety of cross-sectional shapes.

To this point, discussion with reference to the Figures has focused on the structure and structural relationships of each component of the MVES. Now, with reference to FIG. 6, a flow diagram of a process of the MVES will be described. The MVES can include the VEMs and VEM-Rs described above and processing circuitry of a VECD. The VECD will be described in detail with reference to FIG. 9.

At step 660 of process 655, processing circuitry of the VECD can receive a proximity signal from a proximity sensor disposed at a basal end of a VEM-R. In an example, the proximity sensor is an infrared optical sensor and the proximity signal is a distance from the basal end of the VEM-R to an object, or, a basal end of a VEM.

At step 661 of process 655, the received proximity signal can be compared to a criterion to determine if the received proximity signal is indicative of the presence of a VEM within the VEM-R. In an example, the proximity signal can be a distance and the criterion can be a threshold distance below which it is determined that a VEM is sufficiently resident within a VEM-R. This can also be indicative of a sufficient coupling via a coupling mechanism.

At step 662 of process 655, and having determined that the proximity signal meets the criterion, the processing circuitry can acquire an identity signal from an identity sensor. In an embodiment, the identity sensor may be housed within an ICP port of a VEM-R and an ICP port of a VEM, wherein the VEM-R and the VEM have complementary components of the identity sensor. For instance, the VEM may have an identity tag and the VEM-R may have an identity reader. In an example, the identity sensor is a radio-frequency identification system and the identity signal provides a label, or identifier, of a VEM to a VECD via a VEM-R.

At step 663 of process 655, the acquired identity signal can be matched to a reference identity signal. The reference identity signal can be one of a plurality of reference identity signals stored within a reference identity signal database. Each reference identity signal can be associated with at least one characteristic of a reference vehicle electronics module. The at least one characteristic of the reference vehicle electronics module can be, among others, user interface type, VEM type, VEM function, and other instructions associated with controlling the VEM.

Once matched, the processing circuitry can reassign a VEM-R, at step 664 of process 655, based upon the at least one characteristic of the reference vehicle electronics module. For example, the matching of step 663 may indicate that a VEM within a VEM-R is a sport mode module having a button-type interface for activating or deactivating a sport mode of the automotive vehicle, these descriptors being exemplary of the at least one characteristic. In an embodiment, reassigning a VEM-R according to the matching of an identity signal allows for user control of the VEM based upon the intended function desired by the user.

Figure 7A:
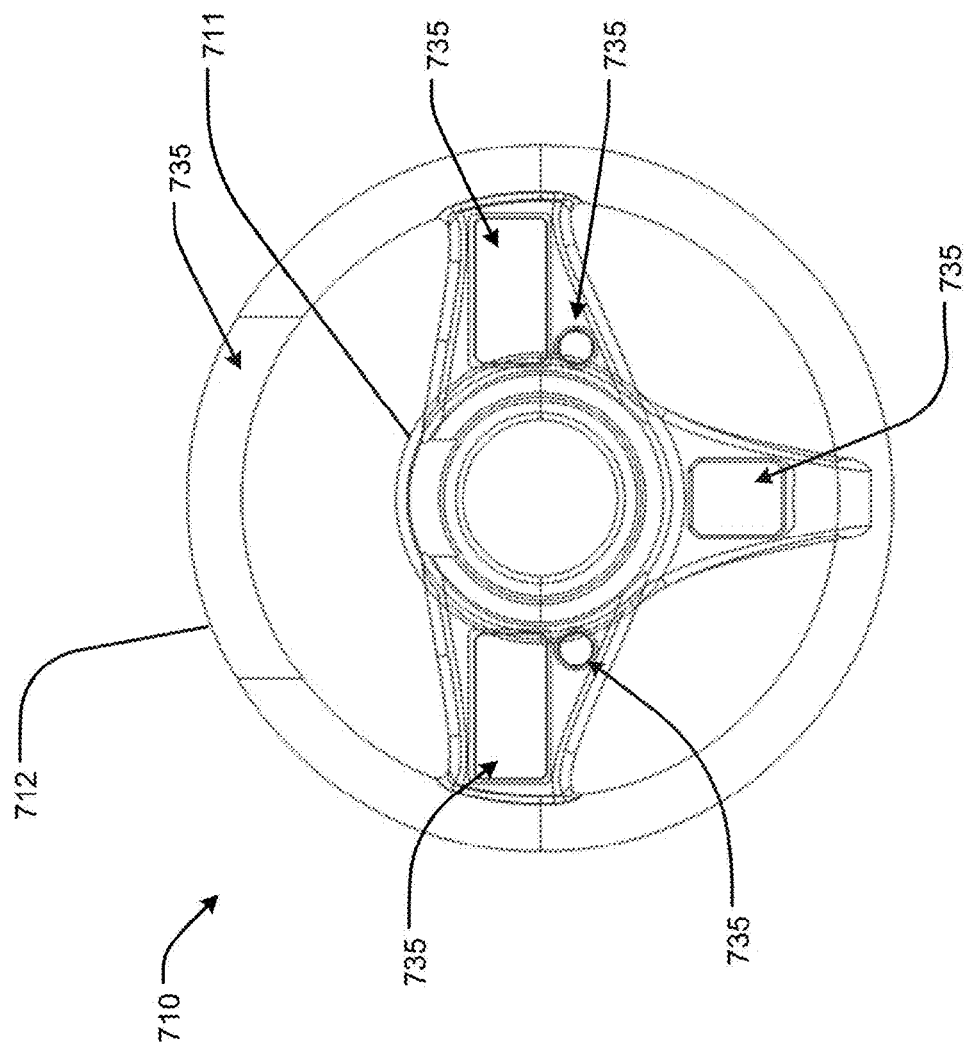
FIG. 7A is an illustration of a steering wheel of an automotive vehicle, according to an exemplary embodiment of the present disclosure.
Figure 7B:
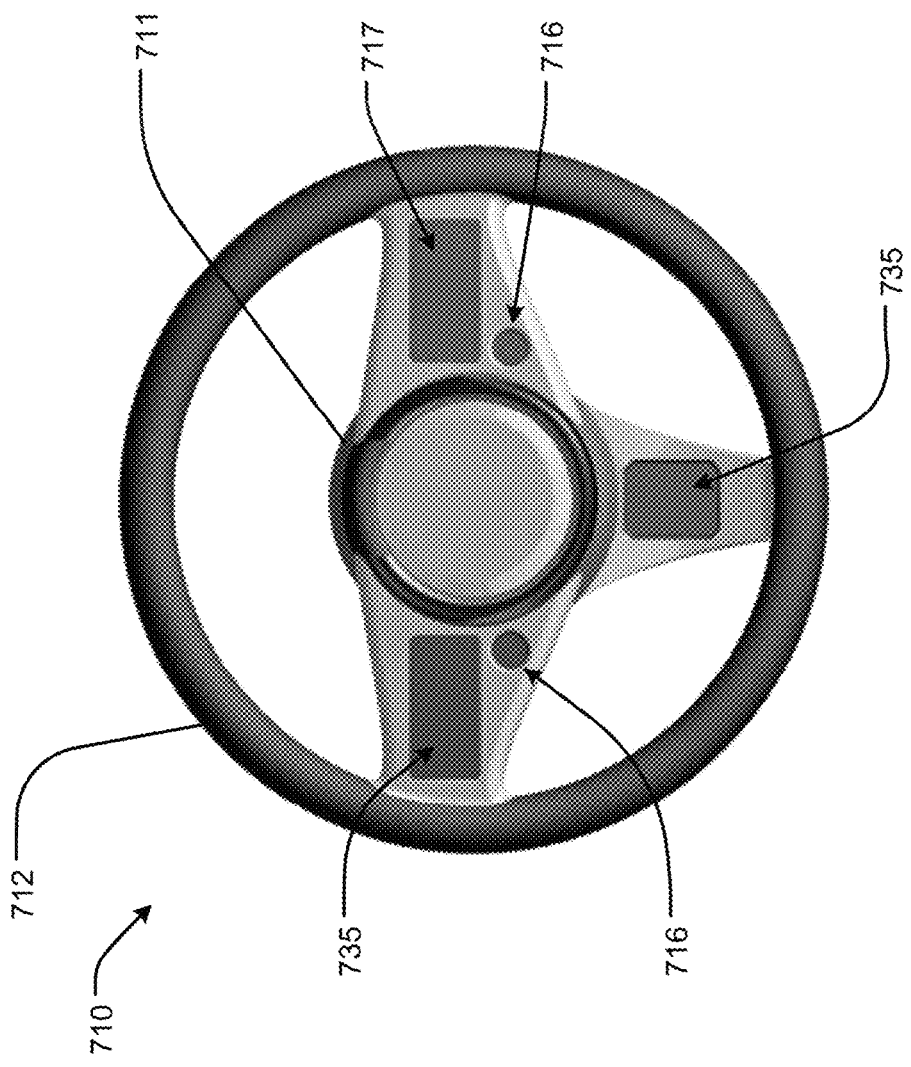
FIG. 7B is a rendered illustration of a steering wheel of an automotive vehicle, according to an exemplary embodiment of the present disclosure.

To this end, FIGS. 7A and 7B are illustrations of a possible configuration of VEM-Rs of an automotive vehicle. In FIG. 7A, a plurality of VEM-Rs 735 are disposed within a body 711 of a steering wheel 710 of an automotive vehicle. Moreover, one or more VEM-Rs 735 can be disposed within a handle 712 of the steering wheel 710 of the automotive vehicle. Each of the VEM-Rs 735 of the steering wheel 710 can then be customized such that a specific VEM is located in a specific VEM-R.

In an embodiment, the VEM-Rs of the automotive vehicle may be integrated within the automotive vehicle during manufacturing and the arrangement, thereof, may be dependent upon the model of automotive vehicle. In an embodiment, the VEM-Rs may be configured according to a user request to allow for even more customization of the locations of VEMs.

Figure 8A:
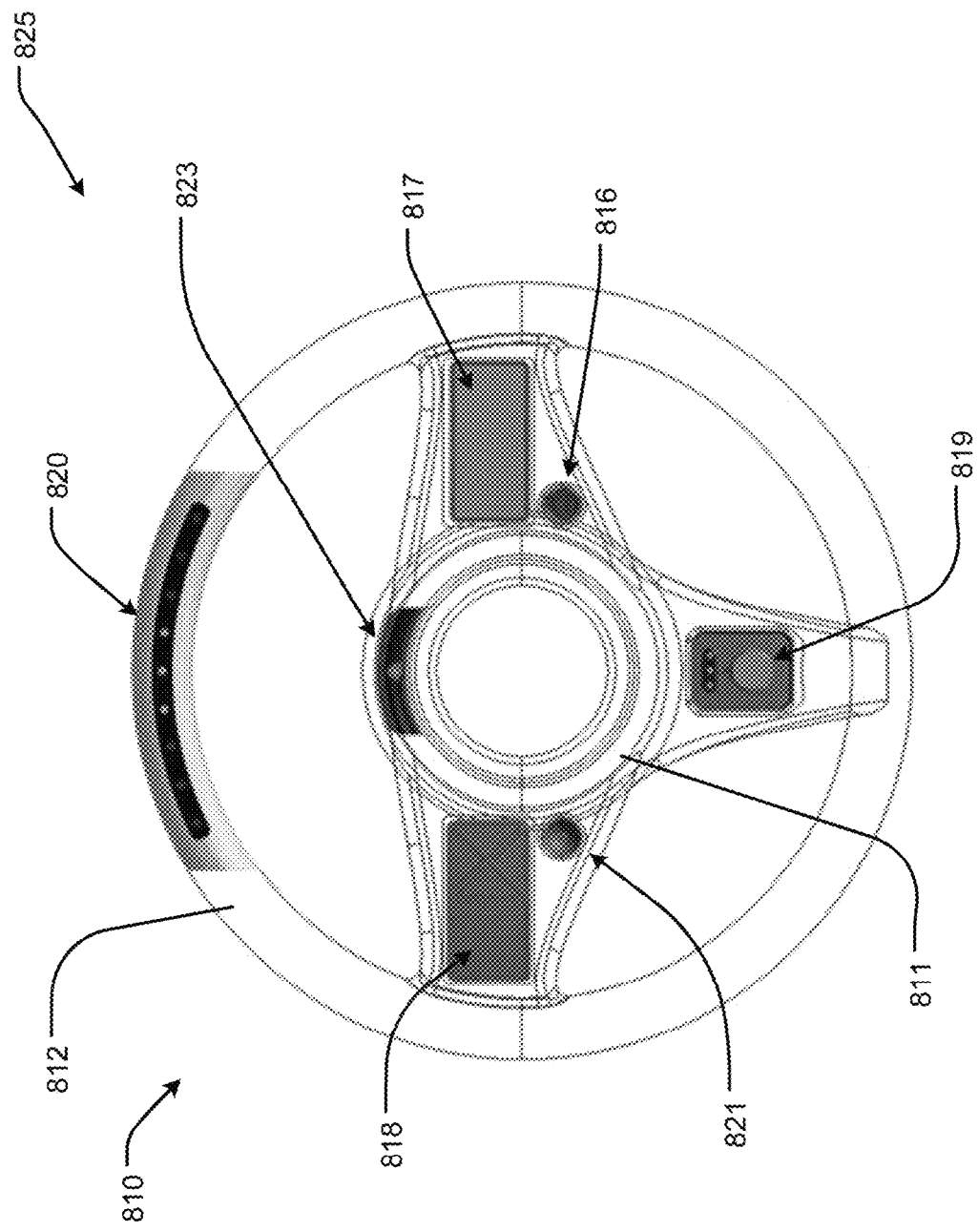
FIG. 8A is an illustration of a steering wheel of an automotive vehicle, according to an exemplary embodiment of the present disclosure.
Figure 8B:
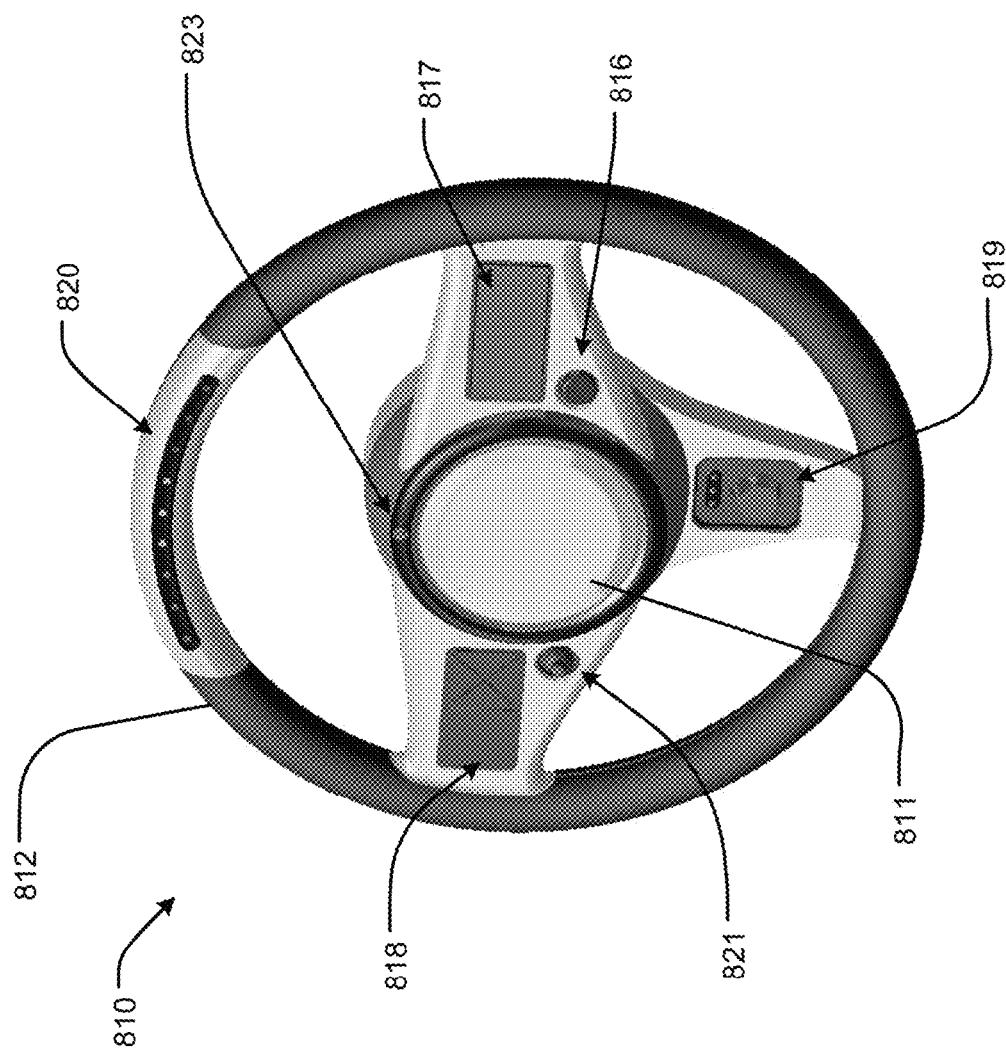
FIG. 8B is a rendered illustration of a steering wheel of an automotive vehicle, according to an exemplary embodiment of the present disclosure.

FIGS. 8A and 8B, therefore, are realizations of user configurations of VEMs within the possible configuration of VEM-Rs presented with respect to FIGS. 7A and 7B. FIG. 8A is a schematic rendition of a steering wheel 810 of an automotive vehicle configured for a track day. In an embodiment, a body 811 of the steering wheel 810 can include a plurality of VEMs 825, each of the plurality of VEMs 825 having, among others, a camera-type interface 823, a rocker-type interface 818, a display-type interface 817, a joystick-type interface 821, a button-type interface 816, and a rotary-type interface 819. Further to the above, a handle 812 of the steering wheel 810 can include a VEM 825 having, among others, an optics-type interface 820, the optics-type interface 820 having one or more light-emitting diodes for indicating a current gear of the automotive vehicle. FIG. 8B provides a rendered illustration of the above-described track day configuration.

Figure 9:
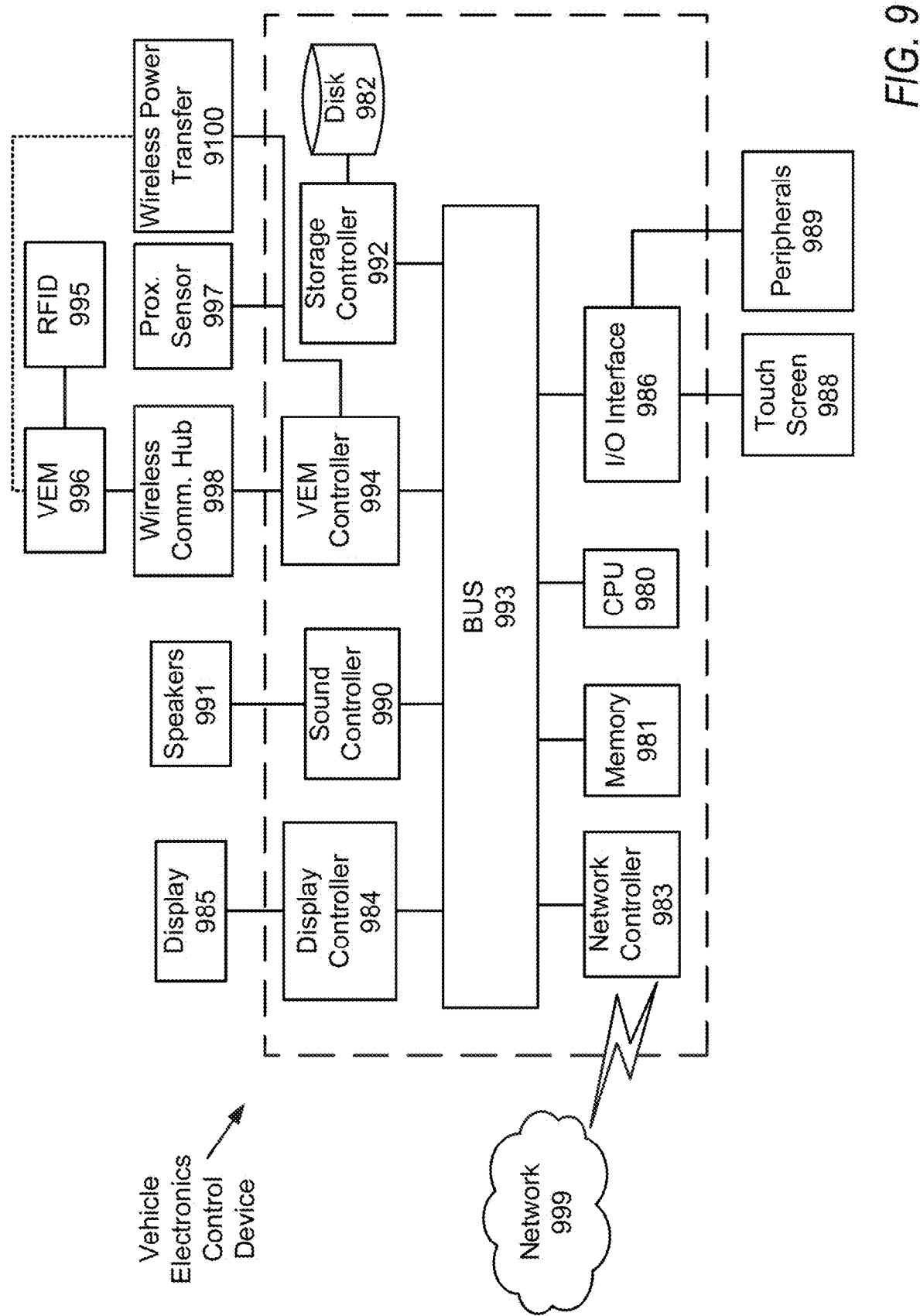
FIG. 9 is a schematic of a hardware implementation of a vehicle electronics control device, according to an exemplary embodiment of the present disclosure.

Next, a hardware description of the VECD ("vehicle electronics control device"), according to exemplary embodiments, is described with reference to FIG. 9. In FIG. 9, the VECD includes a CPU 980 which performs the processes described above and/or below. The process data and instructions may be stored in memory 981. These processes and instructions may also be stored on a storage medium disk 982 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the VECD communicates, such as a server or computer.

Further, the claimed advancements may be provided as a utility application, background daemon, or component of an operating system, or combination thereof, executing in conjunction with CPU 980 and an operating system such as Microsoft Windows 7, UNIX, Solaris, LINUX, Apple MAC-OS and other systems known to those skilled in the art.

The hardware elements in order to achieve the VECD may be realized by various circuitry elements, known to those skilled in the art. For example, CPU 980 may be a Xenon or Core processor from Intel of America or an Opteron processor from AMD of America, or may be other processor types that would be recognized by one of ordinary skill in the art. Alternatively, the CPU 980 may be implemented on an FPGA, ASIC, PLD or using discrete logic circuits, as one of ordinary skill in the art would recognize. Further, CPU 980 may be implemented as multiple processors cooperatively working in parallel to perform the instructions of the inventive processes described above.

The VECD in FIG. 9 also includes a network controller 983, such as an Intel Ethernet PRO network interface card from Intel Corporation of America, for interfacing with a network 999. As can be appreciated, the network 999 can be a public network, such as the Internet, or a private network such as an LAN or WAN network, or any combination thereof and can also include PSTN or ISDN sub-networks. The network 999 can also be wired, such as an Ethernet network, or can be wireless such as a cellular network including EDGE, 3G and 4G wireless cellular systems. The wireless network can also be WiFi, Bluetooth, or any other wireless form of communication that is known.

The VECD further includes a display controller 984, such as a NVIDIA GeForce GTX or Quadro graphics adaptor from NVIDIA Corporation of America for interfacing with display 984, such as a Hewlett Packard HPL2445w LCD monitor. A general purpose I/O interface 986 interfaces with a touch screen panel 988 on or separate from display 985. General purpose I/O interface also connects to a variety of peripherals 989 which may include microphones, knobs, buttons, and the like.

A sound controller 990 is also provided in the VECD, such as Sound Blaster X-Fi Titanium from Creative, to interface with speakers 991 thereby providing sounds and/or music.

A vehicle electronics module controller 994 is also provided in the VECD. The vehicle electronics module controller 994 interfaces with a proximity sensor 997 disposed at a basal end of a VEM-R as well as with a VEM 996 via a communication hub. As appropriate in the context of the flow diagram of FIG. 6, with confirmation of the presence of a VEM by the proximity sensor 997, the VEM 996 can be controlled to acquire information via a short-range wireless communication mechanism 995 including a radio-frequency identification reader and a radio-frequency identification tag, as described above.

According to an embodiment, the communication hub can provide communication between the VEM 996 and the VECD and can occur via wired or wireless connection. Wireless communication can occur via wireless communication hub 998 controlled by the vehicle electronics module controller 994. In an example, the wireless communication hub 998 employs Bluetooth but it can be appreciated that any modality allowing for dynamic wireless communication can be used, including, among others, infrared transmission, Zigbee, and the like.

According to an embodiment, the vehicle electronics module controller 994 can also provide power to the VEM 996 via wireless power transfer mechanism 9100. As described previously, the wireless power transfer mechanism 9100 can be located within a VEM-R and can be an inductive mechanism controlled by the vehicle electronics module controller 994 to be in an active state when a VEM 996 is within the VEM-R and to be in an inactive state when a VEM 996 is not within the VEM-R.

The general purpose storage controller 992 connects the storage medium disk 982 with communication bus 993, which may be an ISA, EISA, VESA, PCI, or similar, for interconnecting all of the components of the VECD. A description of the general features and functionality of the display 985, the display controller 984, storage controller 992, network controller 983, sound controller 990, and general purpose I/O interface 986 is omitted herein for brevity as these features are known.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A modular vehicle electronics system, comprising a vehicle electronics module receptacle, the vehicle electronics module receptacle being a structure having a proximity sensor at a basal end, a vehicle electronics module being insertable into the vehicle electronics module receptacle, the vehicle electronics module being a structure corresponding to the structure of the vehicle electronics module receptacle and having, at an apical end, a user interface, and processing circuitry configured to receive, from the proximity sensor, a proximity signal, determine whether the received proximity signal achieves a pre-determined proximity threshold, acquire, based upon the determination, an identity signal from an identity sensor, the identity signal corresponding to an identity of the vehicle electronics module, match the acquired identity signal with a reference identity signal stored within a reference identity signal database, the reference identity signal being associated with an at least one characteristic of a reference vehicle electronics module, and assign, based upon the match, the at least one characteristic of the reference vehicle electronics module to the vehicle electronics module, one of the at least one characteristic of the reference electronics module being an intended function.

(2) The system according to (1), wherein the vehicle electronics module includes, at a basal end of the vehicle electronics module, one or more magnetic elements for securing the vehicle electronics module within the vehicle electronics module receptacle.

(3) The system according to either (1) or (2), wherein one of the at least one characteristic of the reference vehicle electronics module indicates a type of user interface of the vehicle electronics module.

(4) The system according to any of (1) to (3), wherein the proximity sensor is an electromagnetic proximity sensor.

(5) The system according to any of (1) to (4), wherein the proximity sensor is an optical proximity sensor.

(6) The system according to any of (1) to (5), wherein the optical proximity sensor is a distancing sensor and the pre-determined proximity threshold is a distance between the basal end of the vehicle electronics module receptacle and a basal end of the vehicle electronics module.

(7) The system according to any of claim (1) to (6), wherein the identity sensor includes a radio-frequency identification tag located at a basal end of the vehicle electronics module and a radio-frequency identification reader at the basal end of the vehicle electronics module receptacle.

(8) The system according to any of (1) to (7), wherein the vehicle electronics module receptacle is disposed within a steering wheel of a vehicle.

(9) The system according to any of (1) to (8), wherein the vehicle electronics module receptacle is disposed within a center console of a vehicle.

(10) The system according to any of (1) to (9), wherein a cross-sectional shape of the structure of the vehicle electronics module receptacle is selected from a group of cross-sectional shapes including rectangular, triangular, and elliptical.

(11) A method of a modular vehicle electronics system, comprising receiving, by a processing circuitry, a proximity signal from a proximity sensor, the proximity sensor being disposed at a basal end of a vehicle electronics module receptacle having a structure, determining, by the processing circuitry, whether the received proximity signal achieves a pre-determined proximity threshold, acquiring, by the processing circuitry, an identity signal from an identity sensor based upon the determination, the identity signal corresponding to an identity of a vehicle electronics module, matching, by the processing circuitry, the acquired identity signal with a reference identity signal stored within a reference identity signal database, the reference identity signal being associated with an at least one characteristic of a reference vehicle electronics module, and assigning, by the processing circuitry and based upon the match, the at least one characteristic of the reference vehicle electronics module to the vehicle electronics module, one of the at least one characteristic of the reference electronics module being an intended function, wherein the vehicle electronics module is insertable into the vehicle electronics module receptacle, the vehicle electronics module being a structure corresponding to the structure of the vehicle electronics module receptacle and having, at an apical end, a user interface.

(12) The method according to (11), wherein the vehicle electronics module includes, at a basal end of the vehicle electronics module, one or more magnetic elements for securing the vehicle electronics module within the vehicle electronics module receptacle.

(13) The method according to either (11) or (12), wherein one of the at least one characteristic of the reference vehicle electronics module indicates a type of user interface of the vehicle electronics module.

(14) The method according to any of(1 1) to (13), wherein the proximity sensor is an electromagnetic proximity sensor.

(15) The method according to any of (1 1) to (14), wherein the proximity sensor is an optical proximity sensor.

(16) The method according to any of (11) to (15), wherein the optical proximity sensor is a distancing sensor and the pre-determined proximity threshold is a distance between the basal end of the vehicle electronics module receptacle and a basal end of the vehicle electronics module.

(17) The method according to any of (11) to (16), wherein the identity sensor includes an radio-frequency identification tag located at a basal end of the vehicle electronics module and a radio-frequency identification reader at the basal end of the vehicle electronics module receptacle.

(18) The method according to any of (11) to (17), wherein the vehicle electronics module receptacle is disposed within a steering wheel of a vehicle.

(19) The method according to any of (11) to (18), wherein the vehicle electronics module receptacle is disposed within a center console of a vehicle.

(20) The method according to any of (11) to (19), wherein a cross-sectional shape of the structure of the vehicle electronics module receptacle is selected from a group of cross-sectional shapes including rectangular, triangular, and elliptical.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A modular vehicle electronics system, comprising:
vehicle electronics module receptacles, each vehicle electronics module receptacle being a structure having an opening at an apical end and a proximity sensor at a basal end;
a vehicle electronics module removably-insertable into one of the vehicle electronics module receptacles, the vehicle electronics module being a structure corresponding to a structure of the one of the vehicle electronics module receptacles and having, at an apical end, a user interface; and
processing circuitry resident within the vehicle and configured to
receive, from the proximity sensor, a proximity signal corresponding to a position of the vehicle electronics module relative to the one of the vehicle electronics module receptacles,
determine whether the received proximity signal achieves a pre-determined proximity threshold,
acquire, when it is determined the received proximity signal achieves the pre-determined proximity threshold, an identity signal from an identity sensor of the one of the vehicle electronics module receptacles, the identity signal being derived from interaction with an identity tag of the vehicle electronics module and including an identifier corresponding to an identity of the vehicle electronics module, the identity tag being a radio-frequency identification tag located at a basal end of the vehicle electronics module and the identity sensor being a radio-frequency identification reader at the basal end of the one of the vehicle electronics module receptacles,
match, based on the identifier, the acquired identity signal with a reference identity signal from a plurality of reference identify signals stored within a reference identity signal database, the reference identity signal being associated with an at least one characteristic of a reference vehicle electronics module, the at least one characteristic of the reference vehicle electronics module indicating a type of user interface of the vehicle electronics module, and
assign, based upon the match, the at least one characteristic of the reference vehicle electronics module to the vehicle electronics module within the one of the vehicle electronics module receptacles, one of the at least one assigned characteristic of the vehicle electronics module being an intended function, wherein input subsequently received from the vehicle electronics module is associated with the intended function.

2. The system according to claim 1, wherein the vehicle electronics module includes, at a basal end of the vehicle electronics module, one or more magnetic elements for securing the vehicle electronics module within the one of the vehicle electronics module receptacles.

3. The system according to claim 1, wherein the proximity sensor is an electromagnetic proximity sensor.

4. The system according to claim 1, wherein the proximity sensor is an optical proximity sensor.

5. The system according to claim 4, wherein the optical proximity sensor is a distancing sensor and the pre-determined proximity threshold is a distance between the basal end of the one of the vehicle electronics module receptacles and a basal end of the vehicle electronics module.

6. The system according to claim 1, wherein at least one of the vehicle electronics module receptacles is disposed within a steering wheel of a vehicle.

7. The system according to claim 1, wherein at least one of the vehicle electronics module receptacles is disposed within a center console of a vehicle.

8. The system according to claim 1, wherein a cross-sectional shape of the structure of each vehicle electronics module receptacle is selected from a group of cross-sectional shapes including rectangular, triangular, and elliptical.

9. A method of a modular vehicle electronics system, comprising:
receiving, by processing circuitry and from a proximity sensor of one of a plurality of vehicle electronics module receptacles, a proximity signal corresponding to a position of a vehicle electronics module relative to the one of the plurality of vehicle electronics module receptacles, the one of the plurality of vehicle electronics module receptacles being a structure having an opening at an apical end, the proximity sensor being disposed at a basal end of the one of the plurality of vehicle electronics module receptacles;
determining, by the processing circuitry, whether the received proximity signal achieves a pre-determined proximity threshold;
acquiring, by the processing circuitry and when it is determined the received proximity signal achieves the pre-determined proximity threshold, an identity signal from an identity sensor of the one of the plurality of vehicle electronics module receptacles, the identity signal being derived from interaction with an identity tag of the vehicle electronics module and including an identifier corresponding to an identity of the vehicle electronics module the identity tag being a radio-frequency identification tag located at a basal end of the vehicle electronics module and the identity sensor being a radio-frequency identification reader at the basal end of the one of the vehicle electronics module receptacles,:
matching, by the processing circuitry based on the identifier, the acquired identity signal with a reference identity signal from a plurality of reference identity signals stored within a reference identity signal database, the reference identity signal being associated with an at least one characteristic of a reference vehicle electronics module, the at least one characteristic of the reference vehicle electronics module indicating a type of user interface of the vehicle electronics module; and
assigning, by the processing circuitry and based upon the match, the at least one characteristic of the reference vehicle electronics module to the vehicle electronics module within the one of the plurality of vehicle electronics module receptacles, one of the at least one assigned characteristic of the vehicle electronics module being an intended function such that input subsequently received from the vehicle electronics module is associated with the intended function,
wherein the vehicle electronics module is removably-insertable into the one of the plurality of vehicle electronics module receptacles, the vehicle electronics module being a structure corresponding to the structure of the one of the plurality of vehicle electronics module receptacles and having, at an apical end, a user interface.

10. The method according to claim 9, wherein the vehicle electronics module includes, at a basal end of the vehicle electronics module, one or more magnetic elements for securing the vehicle electronics module within the one of the plurality of vehicle electronics module receptacles.

11. The method according to claim 9, wherein the proximity sensor is an electromagnetic proximity sensor.

12. The method according to claim 9, wherein the proximity sensor is an optical proximity sensor.

13. The method according to claim 12, wherein the optical proximity sensor is a distancing sensor and the pre-determined proximity threshold is a distance between the basal end of the one of the plurality of vehicle electronics module receptacles and a basal end of the vehicle electronics module.

14. The method according to claim 9, wherein at least one of the plurality of vehicle electronics module receptacles is disposed within a steering wheel of a vechicle.

15. The method according to claim 9, wherein at least one of the plurality of vehicle electronics module receptacles is disposed within a center console of a vehicle.

16. The method according to claim 9, wherein a cross-sectional shape of the structure of each of the plurality of vehicle electronics module receptacles is selected from a group of cross-sectional shapes including rectangular, triangular, and elliptical.

* * * * *